US012604140B2

(12) United States Patent
Gunasekaran

(10) Patent No.: US 12,604,140 B2
(45) Date of Patent: Apr. 14, 2026

(54) SYSTEM AND METHOD FOR CROSS-FADING AUDIO SIGNALS

(71) Applicant: NXP B.V., Eindhoven (NL)

(72) Inventor: Shanmugam Gunasekaran, Bangalore (IN)

(73) Assignee: NXP B.V., Eindhoven (NL)

( * ) Notice: Subject to any disclaimer, the term of this patent is extended or adjusted under 35 U.S.C. 154(b) by 197 days.

(21) Appl. No.: 18/753,088

(22) Filed: Jun. 25, 2024

(65) Prior Publication Data

US 2025/0330748 A1 Oct. 23, 2025

(30) Foreign Application Priority Data

Apr. 23, 2024 (IN) .............................. 202441032202

(51) Int. Cl.
H04R 3/04 (2006.01)
G06F 3/16 (2006.01)

(52) U.S. Cl.
CPC .............. H04R 3/04 (2013.01); G06F 3/162 (2013.01); G06F 3/165 (2013.01)

(58) Field of Classification Search
CPC .......... H04R 3/04; G06F 3/162; G06F 3/165; G10L 25/48; G10L 21/02; G10L 19/02; G10L 19/0204; H04H 20/26
See application file for complete search history.

(56) References Cited

U.S. PATENT DOCUMENTS

| | | | |
|---|---|---|---|
| 9,596,044 B2 | 3/2017 | Nekhamkin et al. | |
| 9,837,061 B2 * | 12/2017 | Gautama ................ | H04H 40/36 |
| 10,255,034 B2 | 4/2019 | Gautama et al. | |
| 10,567,097 B2 | 2/2020 | Gautama et al. | |
| 2004/0043730 A1 | 3/2004 | Schill et al. | |
| 2012/0130516 A1 * | 5/2012 | Reinsch .................. | G06F 17/00 |
| | | | 700/94 |
| 2016/0049155 A1 * | 2/2016 | Siemes .................. | H04H 20/22 |
| | | | 704/500 |
| 2018/0107447 A1 | 4/2018 | Gautama et al. | |
| 2020/0145040 A1 | 5/2020 | Asaka | |

* cited by examiner

*Primary Examiner* — Yosef K Laekemariam

(57) ABSTRACT

A system for cross-fading audio signals receives temporal data associated with the audio signals. Initially, current playback data corresponds to one of the temporal data. The system determines linear and non-linear data of the other temporal data that are linearly and non-linearly correlated with the temporal data, respectively. Further, the system receives a cross-fade request when a parameter value of a signal quality associated with the audio signal of the temporal data exceeds a threshold value. In response, the system cross-fades the current playback data from the temporal data to the linear data of the other temporal data. Additionally, the system inserts the non-linear data to the current playback data to successfully transition from the current temporal data to the other temporal data.

20 Claims, 7 Drawing Sheets

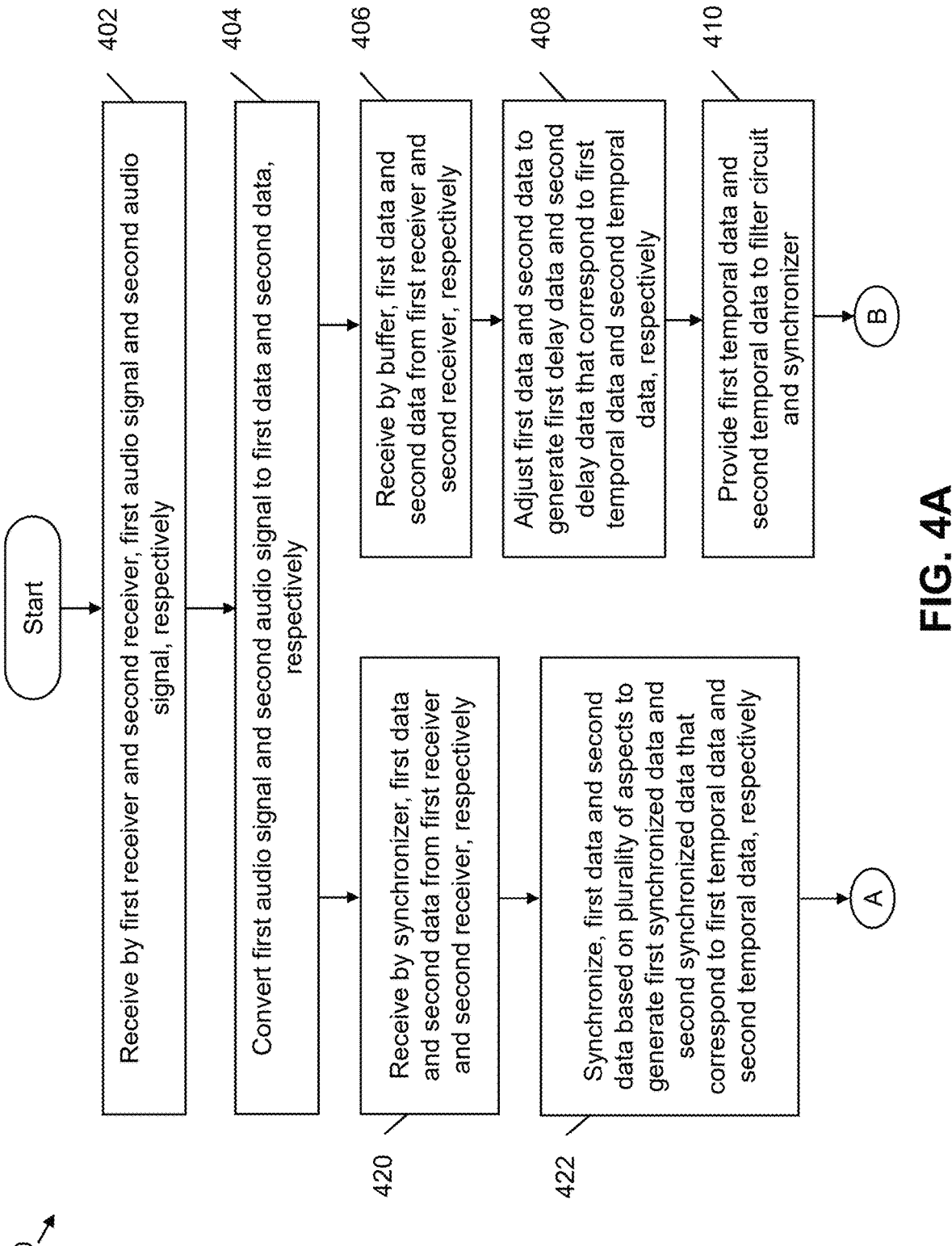

400

Start

402 — Receive by first receiver and second receiver, first audio signal and second audio signal, respectively 404 — Convert first audio signal and second audio signal to first data and second data, respectively 406 — Receive by buffer, first data and second data from first receiver and second receiver, respectively 408 — Adjust first data and second data to generate first delay data and second delay data that correspond to first temporal data and second temporal data, respectively 410 — Provide first temporal data and second temporal data to filter circuit and synchronizer

B

420 — Receive by synchronizer, first data and second data from first receiver and second receiver, respectively 422 — Synchronize, first data and second data based on plurality of aspects to generate first synchronized data and second synchronized data that correspond to first temporal data and second temporal data, respectively

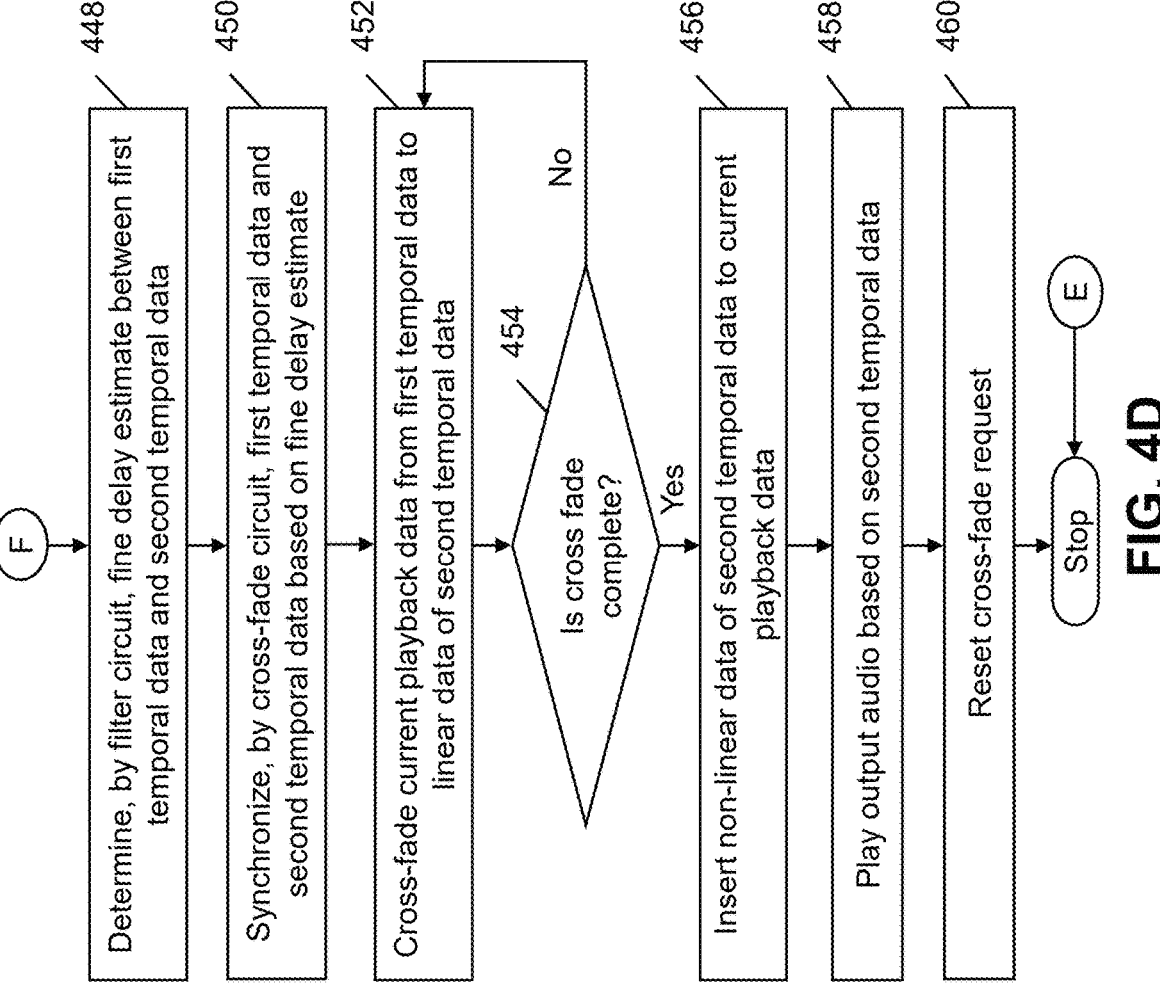

F

448 Determine, by filter circuit, fine delay estimate between first temporal data and second temporal data 450 Synchronize, by cross-fade circuit, first temporal data and second temporal data based on fine delay estimate 452 Cross-fade current playback data from first temporal data to linear data of second temporal data 454 Is cross fade complete?

No

Yes

456 Insert non-linear data of second temporal data to current playback data

458 Play output audio based on second temporal data

460 Reset cross-fade request

E

Stop

FIG. 4D

400

SYSTEM AND METHOD FOR CROSS-FADING AUDIO SIGNALS

CROSS-REFERENCE TO RELATED APPLICATIONS

This application claims priority under 35 U.S.C. § 119 to Indian Patent Application number 202441032202, filed 23 Apr. 2024, the contents of which are incorporated by reference herein.

TECHNICAL FIELD

The present disclosure relates generally to electronic circuits, and, more particularly, to a system and method for cross-fading audio signals.

BACKGROUND

Usually, radio stations may employ dual transmission, e.g., transmit both analog and digital signals via carrier signals, to broadcast a program to a user device of the user. The user device typically demodulates the carrier signals and selects one of the signals (e.g., analog signal or digital signal) for playback. When a quality associated with the carrier signal of the selected signal degrades, the user device may switch to the other signal to compensate for the shortcomings. Such dynamic switching between the two signals is referred to as cross-fading. During cross-fading, discrepancies such as non-linearity or network anomalies may disrupt the switching between the signals resulting in attenuation of specific frequencies. Further, an overall listening experience of the user is compromised.

BRIEF DESCRIPTION OF THE DRAWINGS

The following detailed description of the embodiments of the present disclosure will be better understood when read in conjunction with the appended drawings. The present disclosure is illustrated by way of example, and not limited by the accompanying figures, in which like references indicate similar elements.

FIGS. 4A-4D, collectively, represent a flowchart that illustrates a cross-fading method for audio signals received by the device of the audio broadcast environment of FIG. 1, in accordance with an embodiment of the present disclosure.

DETAILED DESCRIPTION

Figure 1:
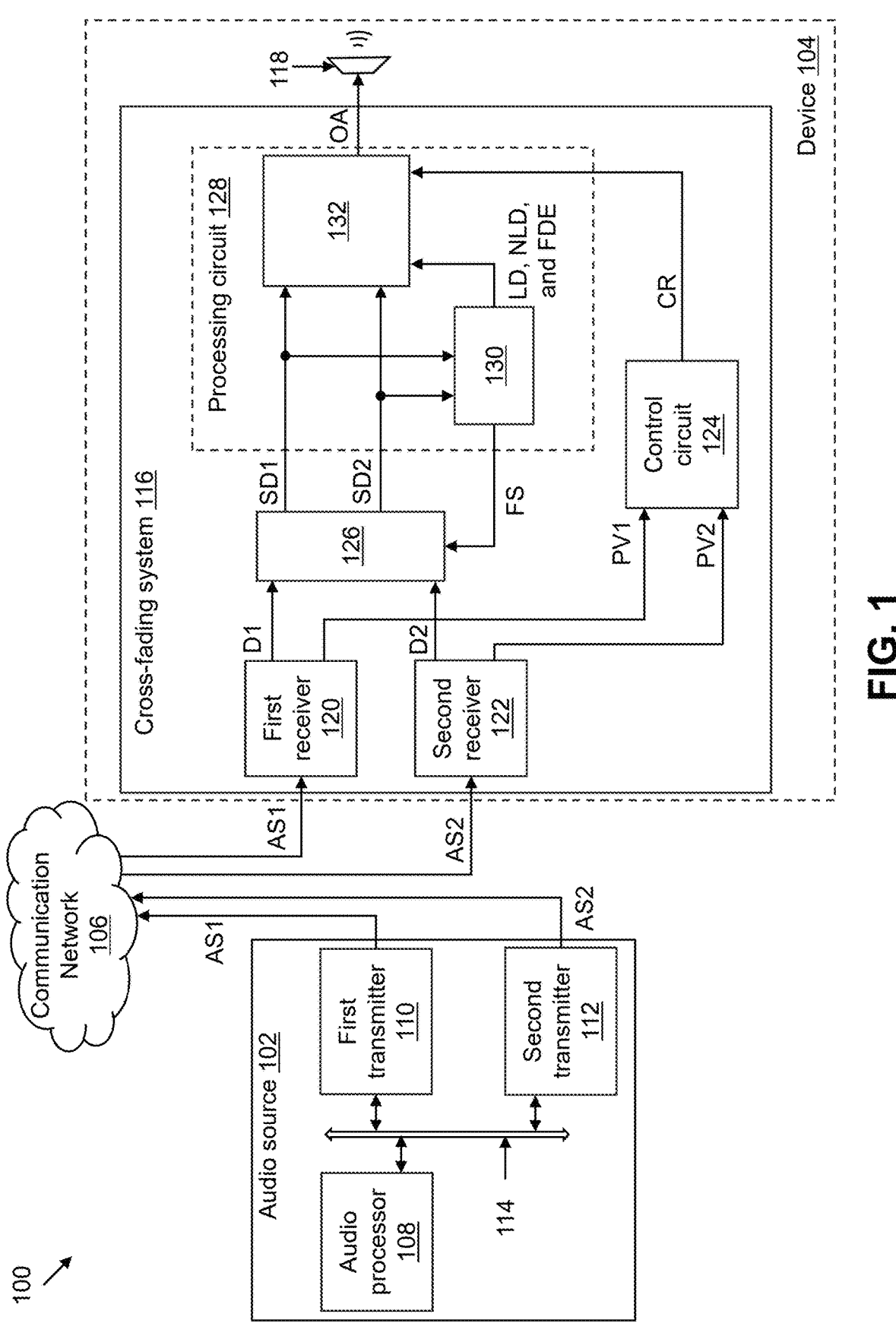
FIG. 1 illustrates a schematic diagram of an audio broadcast environment, in accordance with an embodiment of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview

In conventional radio systems, transmission of audio content relies on two different modes (e.g., a primary audio stream comprising a first signal and a secondary audio stream comprising a second signal) to receive the audio content on a user device in multiple formats (e.g., frequency modulation (FM), amplitude modulation (AM), and digital audio broadcasting (DAB)). Such a setup may provide a user of the user device, access to a broader range of audio reception. In a scenario when a signal strength of the primary audio stream weakens, a cross-fade between the first signal of the primary audio stream and the second signal of the secondary audio stream is initiated by the user device to ensure uninterrupted playback of the audio content. However, during the cross-fade, noticeable audio discrepancies (e.g., comb-filtering artifact) may arise due to non-linear characteristics that may be inherent in the second signal. Due to the audio discrepancies, a duration of the cross-fade may be restricted leading to a non-uniform cross-fade. In addition, when the first signal may correspond to a digital signal whereas the second signal may correspond to an analog signal, the audio discrepancies may be magnified due to inherent differences in processing of the analog and digital signals. Such audio discrepancies may result in attenuation of certain frequencies of the analog signal during the cross-fade that leads to fluctuations in a playback of the audio content thereby degrading an experience of the user. During a transition between the first signal and the second signal, synchronization between the first signal and the second signal is based on cross-correlation. However, the accuracy of the synchronization based on cross-correlation may be limited by various factors (e.g., non-linearity, signal distortion, or the like) within the first signal and the second signal. Further, the cross-fade between the first signal and the second signal may be based on frequency domain processing that may introduce computational complexity and latency in the playback of the audio content.

Various embodiments of the present disclosure disclose a cross-fading system. The cross-fading system may include a processing circuit. The processing circuit may receive first temporal data and second temporal data. The first temporal data may be associated with a first audio signal and the second temporal data may be associated with a second audio signal. Initially, the first temporal data may correspond to current playback data. Further, the processing circuit may determine linear data and non-linear data of the second temporal data that correlates linearly and non-linearly with the first temporal data, respectively. The determination of the linear data and the non-linear data may be based on adjusting filter coefficients of an adaptive filter based on a normalized least mean square (NLMS) algorithm. Based on a time offset for a maximum value of the filter coefficients, the processing circuit may further determine a fine delay estimate between the first temporal data and the second temporal data. Further, the processing circuit may synchronize the first temporal data and the second temporal data based on the fine delay estimate.

The processing circuit may further receive a cross-fade request that may be generated based on analysis of a signal quality associated with the first audio signal. Based on the reception of the cross-fade request, the processing circuit may cross-fade the current playback data from the first temporal data to the linear data of the second temporal data. Upon cross-fading the current playback data to the linear data, the processing circuit may insert the non-linear data of the second temporal data to the current playback data such that the current playback data corresponds to the second temporal data.

The processing circuit of the present disclosure dynamically transitions from the first temporal data to the second temporal data when the reception of the first audio signal degrades. The cross-fade between the first temporal data and the linear data of the second temporal data followed by the insertion of the non-linear data of the second temporal data eliminates audio discrepancies (e.g., comb-filtering artifact), thereby ensuring a seamless transition. In the absence of audio discrepancies, the duration for cross-fade may be extended that may result in an improved and uniform transition. The cross-fade may be based on time-domain processing (e.g., sample-wise processing), thereby reducing computational complexity and eliminating latency in playback of an audio. Further, a memory footprint required for the cross-fade is reduced as compared to conventional solutions that employ frequency domain processing. Additionally, synchronization based on the fine delay estimate ensures precise alignment of the first temporal data and the second temporal data, thereby minimizing disruptions during the cross-fade and enhancing the overall listening experience of the user.

FIG. 1 illustrates a schematic diagram of an audio broadcast environment 100, in accordance with an embodiment of the present disclosure. The audio broadcast environment 100 may include an audio source 102 and a device 104. Examples of the audio source 102 may include radio stations, podcast platforms, music streaming services, or the like. Examples of the device 104 may include car radios, home audio systems, smart speakers, mobile devices, portable radios, or the like.

The audio broadcast environment 100 may further include a communication network 106. The device 104 may receive audio signals from the audio source 102 by way of the communication network 106. Examples of the communication network 106 may include a cellular network, satellite communication, a local area network (LAN), a wide area network (WAN), or the like.

Although it is mentioned that the device 104 may receive audio signals from the audio source 102 by way of the communication network 106, in various other embodiments, the device 104 may directly receive the audio signals from the audio source 102. For example, frequency modulation (FM) radio signals are broadcast over the air and received by the device 104 directly. Additionally, amplitude modulation (AM) radio signals, digital FM radio signals, and internet radio signals are broadcast over the air and received by the device 104 directly.

Audio Source 102:

The audio source 102 may be configured to broadcast or transmit audio signals such as a first audio signal AS1 and a second audio signal AS2 to the device 104 as explained herein. The audio source 102 may include an audio processor 108, a first transmitter 110, and a second transmitter 112. Examples of the audio source 102 may include a commercial radio station, a community radio station, an emergency information service, or the like.

Audio Processor 108:

The audio processor 108 may include suitable circuitry that may be configured to perform one or more operations. For example, the audio processor 108 may be configured to receive an input audio signal from one or more sources (e.g., a microphone that may capture an input audio). Examples of the input audio signal may include vocals, speech, telecommunication, ambient sound, or the like. Examples of the audio processor 108 may include a central processing unit (CPU), a microcontroller, an application-specific integrated circuit (ASIC), or the like. The audio processor 108 may process the input audio signal by applying signal processing techniques. Examples of the signal processing techniques may include equalization, compression, pitch shift, noise reduction, or the like.

The audio processor 108 may be further configured to process the input audio signal linearly and non-linearly to generate an output audio signal (e.g., the first audio signal AS1 and the second audio signal AS2). During linear processing, the output audio signal may exhibit linearity with the input audio signal. In other words, the output audio signal may be directly proportional to the input audio signal such that a linear correlation may exist between the input audio signal and the output audio signal. In an example, a gain adjustment of 3 decibels (dB) is applied to the input audio signal to process the output audio signal linearly such that volume of the output audio signal increases linearly. Examples of the linear audio processing may include audio gain manipulation, linear equalization, noise reduction, time stretching, delaying, mixing, or the like. During non-linear processing, the output audio signal may exhibit non-linearity with the input audio signal. In other words, the output audio signal may not be directly proportional to the input audio signal such that a non-linear correlation may exist between the output audio signal and the input audio signal. In an example, a saturation effect is applied to the input audio signal such that the output audio signal is processed non-linearly and harmonic content (absent in the input audio signal) is introduced in the output audio signal. Examples of the non-linear audio processing may include, compression, saturation, ring modulation, phase distortion, or the like.

Although the first audio signal AS1 and the second audio signal AS2 may be generated by a single source (e.g., the audio source 102), non-linearity may be introduced in at least one of the first audio signal AS1 and the second audio signal AS2 due to a plurality of factors. Examples of the plurality of factors may include, variation in signal processing, environmental factors, distortions during playback, non-linear processing, or the like.

First Audio Signal AS1:

The audio processor 108 may further convert the input audio signal to digital data. During the conversion, the audio processor 108 may compress audio contents of the input audio signal using a compression algorithm (e.g., advanced audio coding (AAC)). Additionally, the audio processor 108 may combine additional service information such as metadata and error correction code with the digital data. Examples of the metadata may include a title of a song, a name of an artist, an identifier of the radio station, or the like. The audio processor 108 may be further configured to implement a modulation scheme to ensure efficient utilization of an available frequency spectrum and robustness to interference during transmission of the digital data. An example of the modulation scheme may include a coded orthogonal frequency division multiplexing (COFDM) modulation scheme. In an example, the available frequency spectrum is divided into 1000 subcarriers, each with a bandwidth of 20 hertz (Hz). Therefore, a total of 1000 channels may be transmitted within a total bandwidth of 20 kilohertz (kHz).

The audio processor 108 may divide the digital data into multiple orthogonal subcarriers and modulate using phase and amplitude modulation techniques to generate the first audio signal AS1 such that the first audio signal AS1 may correspond to a digital signal that may offer high audio fidelity and clarity compared to an analog signal.

Second Audio Signal AS2:

The audio processor 108 may modulate the input audio signal onto a carrier wave using various modulation schemes (e.g., FM, AM, or the like) to generate the second audio signal AS2 such that the second audio signal AS2 may correspond to the analog signal.

Although it is mentioned that the first audio signal AS1 corresponds to the digital signal and the second audio signal AS2 corresponds to the analog signal, in various other embodiments, each of the first audio signal AS1 and the second audio signal AS2 may correspond to the digital signal or the analog signal.

First Transmitter 110:

The first transmitter 110 may include suitable circuitry that may be configured to perform one or more operations. For example, the first transmitter 110 may be configured to transmit the first audio signal AS1 to the device 104. The first transmitter 110 may transmit the first audio signal AS1 to the device 104 by way of the communication network 106. Examples of the first transmitter 110 may include a digital audio broadcasting (DAB) transmitter.

Second Transmitter 112:

The second transmitter 112 may include suitable circuitry that may be configured to perform one or more operations. For example, the second transmitter 112 may be configured to transmit the second audio signal AS2 to the device 104. The second transmitter 112 may transmit the second audio signal AS2 to the device 104 by way of the communication network 106. Examples of the second transmitter 112 may include an FM transmitter, an AM transmitter, or the like.

Additionally, the audio processor 108 may be communicatively coupled to the first transmitter 110 and the second transmitter 112 via a communication channel 114 or a communication bus. Examples of the communication channel 114 may include a fiber optic cable, an ethernet cable, a coaxial cable, or the like. In an example, the audio source 102 may be a broadcasting station that may include the audio processor 108, the first transmitter 110, and the second transmitter 112. The audio processor 108 may generate a first signal (not numbered) and a second signal (not numbered). The audio processor 108 may further provide the first signal to the first transmitter 110 and the second signal to the second transmitter 112. The data associated with each of the first signal and the second signal may be a live feed of a sports event, for example. The audio processor 108, the first transmitter 110, and the second transmitter 112 may communicate with each other by way of the communication channel 114. The first transmitter 110 and the second transmitter 112 may be radio stations that may broadcast the first audio signal AS1 and the second audio signal AS2, respectively by transmitting the first audio signal AS1 and the second audio signal AS2 to a plurality of electronic devices (e.g., the device 104).

Device 104:

The device 104 may be an audio device that plays audio based on received audio signals (e.g., the first audio signal AS1 and the second audio signal AS2) in one or more formats (e.g., analog format and digital format). The device 104 may be configured to receive the first audio signal AS1 and the second audio signal AS2 from the first transmitter 110 and the second transmitter 112, respectively. The device 104 may be configured to generate first data D1 and second data D2. The first data D1 and the second data D2 may be a digital version of the first audio signal AS1 and the second audio signal AS2, respectively. The device 104 may be further configured to generate first temporal data and second temporal data based on the first data D1 and the second data D2, respectively. In an embodiment, the first temporal data and the second temporal data may correspond to first synchronized data SD1 and second synchronized data SD2, respectively, when the first temporal data and the second temporal data are synchronized versions of the first data D1 and the second data D2, respectively. The device 104 may be further configured to generate output audio OA based on the first synchronized data SD1. Further, the device 104 may be configured to determine a first parameter value PV1 of a signal quality associated with the first audio signal AS1.

The device 104 may be further configured to detect whether the first parameter value PV1 exceeds a first threshold value. Upon detecting that the first parameter value PV1 exceeds the first threshold value, the device 104 may be further configured to cross-fade from the first synchronized data SD1 to the second synchronized data SD2. The device 104 may be further configured to generate the output audio OA based on the second synchronized data SD2 upon cross-fading from the first synchronized data SD1 to the second synchronized data SD2.

The device 104 may include a cross-fading system 116 and a speaker 118. The cross-fading system 116 may include a first receiver 120, a second receiver 122, a control circuit 124, a synchronizer 126, and a processing circuit 128.

First Receiver 120:

The first receiver 120 may include suitable circuitry that may be configured to perform one or more operations. For example, the first receiver 120 may be configured to receive the first audio signal AS1. The first receiver 120 may be further configured to convert the first audio signal AS1 to the first data D1. The first data D1 may include digital data, metadata, and an error correction code. In an embodiment, to convert the first audio signal AS1 to the first data D1, the first receiver 120 may demodulate the first audio signal AS1. Further, the first receiver 120 may convert the input audio signal from an analog format to the first data D1 in a digital format using pulse code modulation (PCM) (e.g., the first data D1 may be PCM data). The first receiver 120 may be further configured to provide the first data D1 to the synchronizer 126. Additionally, the first receiver 120 may be further configured to detect the signal quality associated with the first audio signal AS1 and determine the first parameter value PV1 of the signal quality associated with the first audio signal AS1. The first receiver 120 may determine the first parameter value PV1 based on fixed time intervals (e.g., every two seconds or some other time interval;). Additionally, the first receiver 120 may detect the signal quality associated with the first audio signal AS1 based on various criteria (e.g., environmental conditions, location-based analysis, motion-based analysis, reception power levels, or the like). Examples of PV1 and the signal quality associated with the first audio signal AS1 may correspond to at least one of a bit-error rate (BER), a cyclic redundancy check (CRC) error, a clock synchronization error, a quantization error, a loss of data, an interference, a clipping, a checksum error, a logic-error, an overflow error, an underflow error, a signal power indicator, a reception power level, reception information, baseband information, or the like.

Second Receiver 122:

The second receiver 122 may include suitable circuitry that may be configured to perform one or more operations. For example, the second receiver 122 may be a DAB receiver configured to receive the second audio signal AS2. The second receiver 122 may be further configured to convert the second audio signal AS2 to the second data D2. In an embodiment, to convert the second audio signal AS2 to the second data D2, the second receiver 122 may initially demodulate the second audio signal AS2 to extract the input audio signal. Further, the second receiver 122 may convert the input audio signal from an analog format to the second data D2 in a digital format using PCM (e.g., the second data D2 may be PCM data). The second receiver 122 may be further configured to provide the second data D2 to the synchronizer 126. Additionally, the second receiver 122 may be further configured to detect a signal quality associated with the second audio signal AS2 and determine a second parameter value PV2 of the signal quality associated with the second audio signal AS2. The second receiver 122 may determine the second parameter value PV2 based on fixed time intervals (e.g., every two seconds or some other time interval). Additionally, the second receiver 122 may detect the signal quality associated with the second audio signal AS2 based on various criteria (e.g., environmental conditions, location-based analysis, motion-based analysis, or the like). Examples of PV2 and the signal quality associated with the second audio signal AS2 may correspond to at least one of a group consisting of the BER, the CRC error, the clock synchronization error, the quantization error, the loss of data, the interference, the clipping, the checksum error, the logic-error, the overflow error, the underflow error, a signal power indicator, a reception power level, reception information, baseband information, or the like.

Control Circuit 124:

The control circuit 124 may be coupled to the first receiver 120 and the second receiver 122. The control circuit 124 may include suitable circuitry that may be configured to perform one or more operations. For example, the control circuit 124 may be configured to receive the first parameter value PV1 and the second parameter value PV2 from the first receiver 120 and the second receiver 122, respectively. The control circuit 124 may be further configured to detect whether the first parameter value PV1 exceeds the first threshold value. The first threshold value may correspond to an acceptable upper limit of the first parameter value PV1. The control circuit 124 may be further configured to generate a cross-fade request CR (or cross-fade signal) when the first parameter value PV1 exceeds the first threshold value. The cross-fade request CR is a signal that causes the processing circuit 128 to perform cross-fading (e.g., from SD1 to SD2 or vice versa), and may be indicative of gradual transitioning between different audio data (e.g., the first synchronized data SD1 and the second synchronized data SD2).

Although it is mentioned that the control circuit 124 may generate the cross-fade request CR, in various other embodiments, the control circuit 124 may be further coupled to a host processor such that the control circuit 124 may be an interface between the host processor and the cross-fading system 116. The host processor may receive the first parameter value PV1 and the second parameter value PV2 via the control circuit 124. Further, the host processor may instruct the control circuit 124 to generate the cross-fade request CR when the first parameter value PV1 exceeds the first threshold value. For example, PV1 may be a measurement of BER, and the first threshold value for BER may be in a range of 1% to 4% (e.g., 2%), although PV1 may correspond to a different signal quality metric and/or the first threshold value range may be different. As an example, the control circuit 124 may receive the first parameter value PV1 with a value of about 5% for the BER from the first receiver 120. The host processor may receive the first parameter value PV1 from the control circuit 124. Further, upon determining that the received PV1 (e.g., 5% BER) exceeds the first threshold value (e.g., 2% BER), the host processor may instruct the control circuit 124 to generate the cross-fade request CR to transition between different audio signals (e.g., transition from the first audio signal AS1 to the second audio signal AS2 when the current output audio OA is based on the first audio signal AS1).

The control circuit 124 may be further configured to generate the cross-fade request CR upon determining that the first parameter value PV1 has fallen below the first threshold value at the fixed time intervals, which may cause a transition between the second audio signal AS2 back to the first audio signal AS1.

Synchronizer 126:

The synchronizer 126 may be coupled to the first receiver 120 and the second receiver 122. The synchronizer 126 may include suitable circuitry that may be configured to perform one or more operations. For example, the synchronizer 126 may be configured to receive the first data D1 and the second data D2 from the first receiver 120 and the second receiver 122, respectively. The synchronizer 126 may be further configured to synchronize the first data D1 and the second data D2 based on a plurality of aspects to generate the first synchronized data SD1 and the second synchronized data SD2. Examples of the plurality of aspects correspond to one of a group consisting of phase alignment, clock synchronization, clock drift alignment, time alignment, latency, sample rates, or the like. In an example, the synchronizer 126 time aligns the second data D2 with respect to the first data D1 such that the first synchronized data SD1 and the second synchronized data SD2 are time aligned with respect to each other. In another example, the synchronizer 126 aligns each of the first data D1 and the second data D2 with respect to a common clock signal. In yet another example, the synchronizer 126 resamples one of the first synchronized data SD1 and the second synchronized data SD2 to match sampling rates of both the first synchronized data SD1 and the second synchronized data SD2. The synchronizer 126 may be further configured to provide the first synchronized data SD1 and the second synchronized data SD2 to the processing circuit 128.

Processing Circuit 128:

The processing circuit 128 may be coupled to the control circuit 124 and the synchronizer 126. The processing circuit 128 may be configured to receive the first synchronized data SD1 (e.g., the first temporal data) and the second synchronized data SD2 (e.g., the second temporal data) from the synchronizer 126. The first synchronized data SD1 may be associated with the first audio signal AS1 and the second synchronized data SD2 may be associated with the second audio signal AS2.

The processing circuit 128 may be further configured to determine the linear data LD and the non-linear data NLD of the second synchronized data SD2. Additionally, the processing circuit 128 may be further configured to receive the cross-fade request CR that may be generated based on analysis of the first parameter value PV1 in the first audio signal AS1. The processing circuit 128 may be further configured to cross-fade, based on the received cross-fade request CR, the current playback data from the first synchronized data SD1 to the linear data LD of the second synchronized data SD2 for a first time period. The processing circuit 128 may be further configured to insert the non-linear data NLD of the second synchronized data SD2 to the current playback data at the end of the first time period. When the current playback data corresponds to the first synchronized data SD1, the processing circuit 128 may generate the output audio OA based on the current playback data. The output audio OA may be generated such that the output audio OA is identical to the input audio received by the audio source 102. Further, the speaker 118 may play the output audio OA.

Although it is mentioned that the output audio OA is identical to the input audio, in various other embodiments, the output audio OA may be a modified version of the input audio. The processing circuit 128 may include a filter circuit 130 and a cross-fade circuit 132.

Filter Circuit 130:

The filter circuit 130 may be coupled to the synchronizer 126. The filter circuit 130 may be configured to receive the first synchronized data SD1 and the second synchronized data SD2 from the synchronizer 126. Examples of the filter circuit 130 may include a microprocessor, a CPU, a digital signal processor (DSP), an ASIC, a system-on-chip (SoC), or the like. The second synchronized data SD2 may include linear data LD that may be linearly correlated with the first synchronized data SD1. Additionally, the second synchronized data SD2 may include non-linear data NLD that may be non-linearly correlated with the first synchronized data SD1. The filter circuit 130 may be further configured to determine the linear data LD and the non-linear data NLD of the second synchronized data SD2. In an embodiment, the filter circuit 130 may correspond to the DSP to implement an adaptive filter (e.g., a digital filter). The adaptive filter may be used in a plurality of application areas such as noise cancellation, echo cancellation, equalization, or the like.

The filter circuit 130 may be further configured to adjust filter coefficients of the adaptive filter based on a normalized least mean square (NLMS) algorithm. The NLMS algorithm may offer low computational complexity compared to other adaptive filtering algorithms. Further, the NLMS algorithm may offer proof of convergence in a stable environment to ensure the filter coefficients converge to an optimal value according to an input. The stable environment may correspond to an environment where statistical properties (e.g., mean, variance, and the like) may remain constant over a time period. Additionally, the NLMS algorithm may offer stable behavior with a finite precision arithmetic such that performance of the filter circuit 130 may remain unaffected even with rounding errors introduced by limited precision. Through iterative optimization, the filter circuit 130 may continuously update the filter coefficients based on the NLMS algorithm to minimize the mean square error between desired output data (e.g., the second synchronized data SD2) and actual output data (e.g., the linear data LD of the second synchronized data SD2).

The filter circuit 130 may iteratively update the filter coefficients for a convergence interval (e.g., two seconds). The convergence interval may refer to the time required for an iterative algorithm (e.g., the NLMS algorithm) to reach a stable output (e.g., when the difference between the desired output data and the actual output data is minimized). The convergence interval may be controlled based on a convergence parameter. The convergence parameter may determine how quickly the filter coefficients are adjusted in response to changes in input (e.g., the second synchronized data SD2). For example, the convergence parameter may be set such that the filter circuit 130 may iteratively update the filter coefficients based on the NLMS algorithm and reach the stable output in two seconds. Operations of the filter circuit 130 are further explained in the ongoing description of FIG. 2.

Although it is mentioned that the filter circuit 130 may adjust the filter coefficients of the adaptive filter based on the NLMS algorithm, in various other embodiments, the filter circuit 130 may adjust the filter coefficients based on a least mean square (LMS) algorithm, a recursive least square (RLS) algorithm, or the like.

After the convergence interval, the filter circuit 130 may be further configured to determine a fine delay estimate FDE between the first synchronized data SD1 and the second synchronized data SD2. The fine delay estimate FDE may be indicative of precise delay between the first synchronized data SD1 and the second synchronized data SD2. The fine delay estimate FDE may be determined based on a time offset for a maximum value of the filter coefficients. The maximum value of the filter coefficients may be determined from a tap length of the adaptive filter. The tap length may correspond to a number of consecutive input samples that the adaptive filter may consider simultaneously such that each tap may represent a delay element that may store a previous value (e.g., previous input sample). For example, the tap length of two hundred fifty-six may indicate that the adaptive filter may consider two hundred fifty-five previous input samples. In an example, the tap length of the adaptive filter is sixty-four. Further, the maximum value of the filter coefficients is at a fiftieth tap. In such a scenario, based on the maximum value of the filter coefficients, the filter circuit 130 may determine that a delay between the first synchronized data SD1 and the second synchronized data SD2 is forty-nine samples. In another example, the maximum value of the filter coefficients is at a first tap. In such a scenario, based on the maximum value of the filter coefficients during the tap length, the filter circuit 130 determines that the first synchronized data SD1 and the second synchronized data SD2 are precisely aligned.

The filter circuit 130 may be further configured to provide the fine delay estimate FDE to the synchronizer 126 as a feedback signal FS. Based on the feedback signal FS, internal parameters of the synchronizer 126 may be adjusted such that the synchronization performance of the synchronizer 126 may be restored. In an example, the synchronizer 126 synchronizes the first synchronized data SD1 and the second synchronized data SD2 up to a sixty-sample accuracy. The synchronizer 126 may further receive the feedback signal FS from the filter circuit 130. Based on the feedback signal FS, the synchronizer 126 adjusts a frequency of an internal clock to improve the synchronization performance such that the first synchronized data SD1 and the second synchronized data SD2 are synchronized up to a thirty-sample accuracy.

Cross-Fade Circuit 132:

The cross-fade circuit 132 may be coupled to the control circuit 124, the synchronizer 126, and the filter circuit 130. The cross-fade circuit 132 may include suitable circuitry that may be configured to perform one or more operations. For example, the cross-fade circuit 132 may be configured to receive the first synchronized data SD1 and the second synchronized data SD2 from the synchronizer 126. Examples of the cross-fade circuit 132 may include a microprocessor, a CPU, a digital signal processor (DSP), an ASIC, a system-on-chip (SoC), or the like. The cross-fade circuit 132 may be further configured to receive the fine delay estimate FDE from the filter circuit 130.

The cross-fade circuit 132 may be further configured to synchronize the first synchronized data SD1 and the second synchronized data SD2 based on the fine delay estimate FDE. The cross-fade circuit 132 may be further configured to receive the cross-fade request CR that may be generated based on analysis of the first parameter value PV1 in the first audio signal AS1. Based on the cross-fade request CR, a transition between a primary data stream (e.g., the first synchronized data SD1) and a secondary data stream (e.g., and the second synchronized data SD2) may be initiated. The cross-fade circuit 132 may be further configured to cross-fade, based on the received cross-fade request CR, the current playback data from the first synchronized data SD1 to the linear data LD of the second synchronized data SD2 for the first time period. In an embodiment, the filter circuit 130 may update the filter coefficients until the cross-fade circuit 132 receives the cross-fade request CR.

The first time period may be configured to achieve seamless cross-fade between the first synchronized data SD1 and the linear data LD of the second synchronized data SD2. For example, the first time period may be set between one second to twenty seconds. In an embodiment, the host processor may configure the first time period. Further, the host processor may divide the first time period into a plurality of time segments. For example, when the first time period is set to twenty seconds, the host processor may divide the first time period into two hundred time segments of hundred milliseconds (ms) duration. The cross-fade circuit 132 may cross-fade between the first synchronized data SD1 and the linear data LD of the second synchronized data SD2 for 100 ms iteratively.

Although it is mentioned that the host processor may configure the first time period, in various other embodiments, the first time period may be configured by the control circuit 124 or other components of the device 104. Additionally, it is mentioned that the host processor may divide the first time period into the plurality of time segments, in various other embodiments, the control circuit 124 may divide the first time period into the plurality of time segments.

The cross-fade circuit 132 may be further configured to check iteratively whether the first time period ended. The cross-fade circuit 132 may be further configured to insert the non-linear data NLD of the second synchronized data SD2 to the current playback data at the end of the first time period. The cross-fade circuit 132 may further generate the output audio OA based on the current playback data (e.g., the second synchronized data SD2). Although it is mentioned that the cross-fade circuit 132 may insert the non-linear data NLD of the second synchronized data SD2 to the current playback data at the end of the first time period, in various other embodiments, the cross-fade circuit 132 may insert the non-linear data NLD of the second synchronized data SD2 to the current playback data when the first time period exceeds a threshold time period. For example, the first time period is set to twenty seconds and the threshold time period is eighteen seconds. The cross-fade circuit 132 may insert the non-linear data NLD of the second synchronized data SD2 to the current playback data at the eighteenth second. The non-linear data NLD of the second synchronized data SD2 may be inserted in a short time period (e.g., five ms).

After inserting the non-linear data NLD of the second synchronized data SD2, the current playback data may correspond to the second synchronized data SD2. The cross-fade circuit 132 may be further configured to generate the output audio OA based on the current playback data. Further, the speaker 118 may play the output audio OA. The cross-fade circuit 132 may be further configured to reset the cross-fade request CR when the current playback data may correspond to the second synchronized data SD2.

Although it is mentioned that the filter circuit 130 may determine the linear data LD and the non-linear data NLD of the second synchronized data SD2 before the cross-fade circuit 132 may receive the cross-fade request CR, in various other embodiments, the filter circuit 130 may determine the linear data LD and the non-linear data NLD of the second synchronized data SD2 after the cross-fade circuit 132 receives the cross-fade request CR. Thus, the filter circuit 130 may be further configured to transition from a low power mode to a normal mode when the cross-fade circuit 132 receives the cross-fade request CR. Further, the cross-fade circuit 132 may cross-fade the current playback data from the first synchronized data SD1 to the linear data LD of the second synchronized data SD2. The cross-fade circuit 132 may further insert the non-linear data NLD of the second synchronized data SD2 to the current playback data. The cross-fade circuit 132 may further generate the output audio OA based on the current playback data (e.g., the second synchronized data SD2).

In Operation:

The audio processor 108 may generate the first audio signal AS1 and the second audio signal AS2. The first transmitter 110 and the second transmitter 112 may transmit the first audio signal AS1 and the second audio signal AS2, respectively, to broadcast a program in both digital format (e.g., broadcast the program via the first audio signal AS1) and analog format (e.g., broadcast the program via the second audio signal AS2). Further, the first receiver 120 and the second receiver 122 may receive the first audio signal AS1 and the second audio signal AS2, respectively. Additionally, the first receiver 120 may convert the first audio signal AS1 to the first data D1, and the second receiver 122 may convert the second audio signal AS2 to the second data D2. Further, the synchronizer 126 may receive the first data D1 and the second data D2 from the first receiver 120 and the second receiver 122, respectively. The synchronizer 126 may further synchronize the first data D1 and the second data D2 based on the plurality of aspects to generate the first synchronized data SD1 and the second synchronized data SD2, respectively.

The filter circuit 130 may receive the first synchronized data SD1 and the second synchronized data SD2 from the synchronizer 126. Further, filter circuit 130 may implement the adaptive filter based on the NLMS algorithm to determine the linear data LD and the non-linear data NLD of the second synchronized data SD2. The filter circuit 130 may further adjust the filter coefficients of the adaptive filter based on the NLMS algorithm. Additionally, the filter circuit 130 may determine the fine delay estimate FDE between the first synchronized data SD1 and the second synchronized data SD2 based on the time offset for the maximum value of the filter coefficients. In an embodiment, the filter coefficients may be adjusted until the cross-fade request CR is received by the cross-fade circuit 132.

The first receiver 120 may further determine the first parameter value PV1 of the signal quality associated with the first audio signal AS1, and the second receiver 122 may determine the second parameter value PV2 of the signal quality associated with the second audio signal AS2. The control circuit 124 may receive the first parameter value PV1 and the second parameter value PV2 from the first receiver 120 and the second receiver 122, respectively. In an embodiment, when the current playback data corresponds to the first synchronized data SD1, and the first parameter value PV1 is below the first threshold value, the control circuit 124 may refrain from generating the cross-fade request CR.

Further, the cross-fade circuit 132 may generate the output audio OA based on the first synchronized data SD1.

In another embodiment, the current playback data corresponds to the first synchronized data SD1. Further, the control circuit 124 detects that the first parameter value PV1 exceeds the first threshold value, and the second parameter value PV2 exceeds a second threshold value. In such a scenario, the control circuit 124 may be further configured to compare the first parameter value PV1 with the second parameter value PV2 to determine that the first parameter value PV1 exceeds the second parameter value PV2. The control circuit 124 may further generate the cross-fade request CR to transition the current playback data from the first synchronized data SD1 to the second synchronized data SD2. Further, the cross-fade circuit 132 may generate the output audio OA based on the second synchronized data SD2.

In yet another embodiment, the current playback data corresponds to the first synchronized data SD1. Further, the control circuit 124 detects that the first parameter value PV1 exceeds the first threshold value and the second parameter value PV2 is below the second threshold value. The control circuit 124 may generate the cross-fade request CR to transition the current playback data from the first synchronized data SD1 to the second synchronized data SD2. Further, the cross-fade circuit 132 may generate the output audio OA based on the second synchronized data SD2.

The cross-fade circuit 132 may further receive the cross-fade request CR and the fine delay estimate FDE. Based on the cross-fade request CR and the fine delay estimate FDE, the cross-fade circuit 132 may cross-fade the current playback data from the first synchronized data SD1 to the linear data LD of the second synchronized data SD2. Upon cross-fading, the cross-fade circuit 132 may insert the non-linear data NLD of the second synchronized data SD2 to the current playback data such that the current playback data may be based on the second synchronized data SD2 (e.g., second audio signal AS2).

Further, the filter circuit 130 may implement the adaptive filter based on the NLMS algorithm to determine linear data LD and non-linear data NLD of the first synchronized data SD1. The filter circuit 130 may further adjust the filter coefficients of the adaptive filter based on the NLMS algorithm. Additionally, the filter circuit 130 may further determine a time delay (e.g., the fine delay estimate FDE) between the first synchronized data SD1 and the second synchronized data SD2 based on the time offset for the maximum value of the filter coefficients. In an embodiment, the control circuit 124 may further generate the cross-fade request CR upon determining the first parameter value PV1 is below the first threshold value to transition back from the second synchronized data SD2 (e.g., the second audio signal AS2) to the first synchronized data SD1 (e.g., the first audio signal AS1). The cross-fade circuit 132 may further receive the cross-fade request CR. Based on the cross-fade request CR, the cross-fade circuit 132 may cross-fade the current playback data from the second synchronized data SD2 to the linear data LD of the first synchronized data SD1. Upon cross-fading, the cross-fade circuit 132 may insert the non-linear data NLD of the first synchronized data SD1 to the current playback data such that the current playback data may correspond to the first synchronized data SD1.

Figure 2:
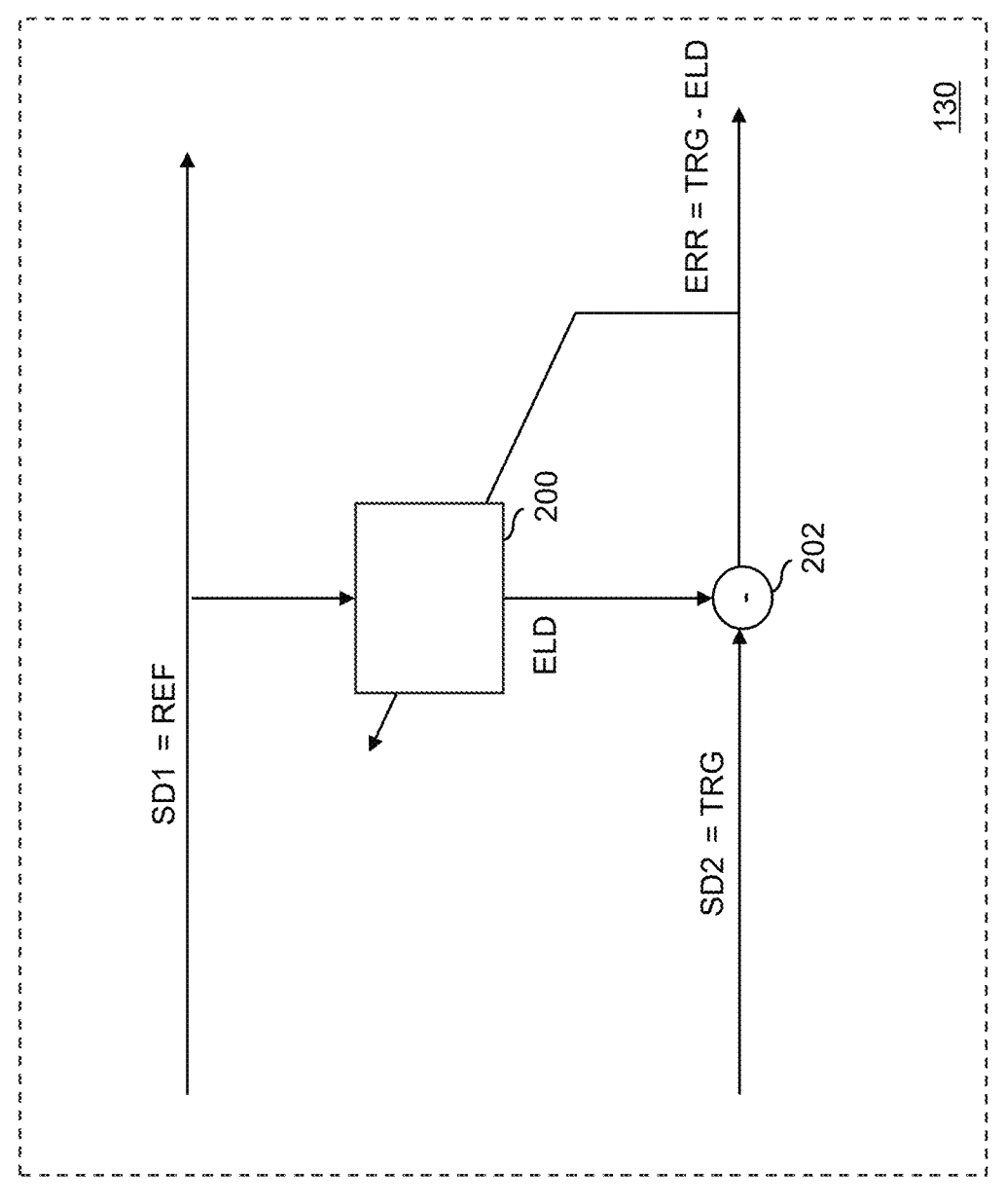
FIG. 2 illustrates a block diagram of a filter circuit of a cross-fading system of a device of the audio broadcast environment of FIG. 1, in accordance with an embodiment of the present disclosure.

FIG. 2 illustrates a block diagram of the filter circuit 130, in accordance with an embodiment of the present disclosure.

The filter circuit 130 may receive the first synchronized data SD1 and the second synchronized data SD2 from the synchronizer 126. In an embodiment, the current playback data corresponds to the first synchronized data SD1. Further, the first synchronized data SD1 may correspond to reference data REF. Additionally, the second synchronized data SD2 may correspond to target data TRG. The filter circuit 130 may include a regulator 200 and a subtractor 202. The regulator 200 may be configured to receive the reference data REF (e.g., the first synchronized data SD1).

Initially, the regulator 200 may be further configured to set the filter coefficients to an initial value. The regulator 200 may set the initial value based on one of random initialization, zero initialization, predefined values, or the like. The regulator 200 may be further configured to multiply the reference data REF with the filter coefficients to generate estimated linear data ELD (e.g., an initial representation of the linear data LD of the second synchronized data SD2).

The subtractor 202 may be configured to receive the target data TRG (e.g., the second synchronized data SD2) and the estimated linear data ELD. The subtractor 202 may be further configured to compute error data ERR (e.g., a difference between the target data TRG and the estimated linear data ELD). In an embodiment, when the reference data REF and the target data TRG are linear, the error data ERR may be negligible (e.g., the non-linear data may be minimal in the second synchronized data SD2). The regulator 200 may be further configured to receive the error data ERR as feedback data. Based on the feedback data, the regulator 200 may be further configured to update the filter coefficients to minimize the error data ERR.

The regulator 200 may iteratively update the filter coefficients for the convergence interval (e.g., two seconds). At the end of the convergence interval, the error data ERR is minimum such that the estimated linear data ELD may correspond to the linear data LD of the second synchronized data SD2. Further, the error data ERR may correspond to the non-linear data NLD of the second synchronized data SD2. In an embodiment, a transfer function for updating the filter coefficients based on the NLMS algorithm is represented by equation (1):

$$w(n+1) = w(n) + \frac{\mu * x(n) * e(n)}{\|x(n)\|^\wedge 2 + \delta} \tag{1}$$

where $w(n)$ is a vector of filter coefficients at iteration $n$, $\mu$ is the convergence parameter, $x(n)$ is an input vector (e.g., a combination of the reference data REF and the target data TRG) at iteration $n$, $e(n)$ is an error (e.g., the error data ERR) at iteration $n$, $\|x(n)\|^\wedge 2$ is a norm of input data vector at iteration $n$, and $\delta$ is regularization parameter. In another embodiment, the transfer function for updating the filter coefficients may be unknown initially. The regulator 200 may be further configured to determine the transfer function based on the NLMS algorithm.

Figure 3:
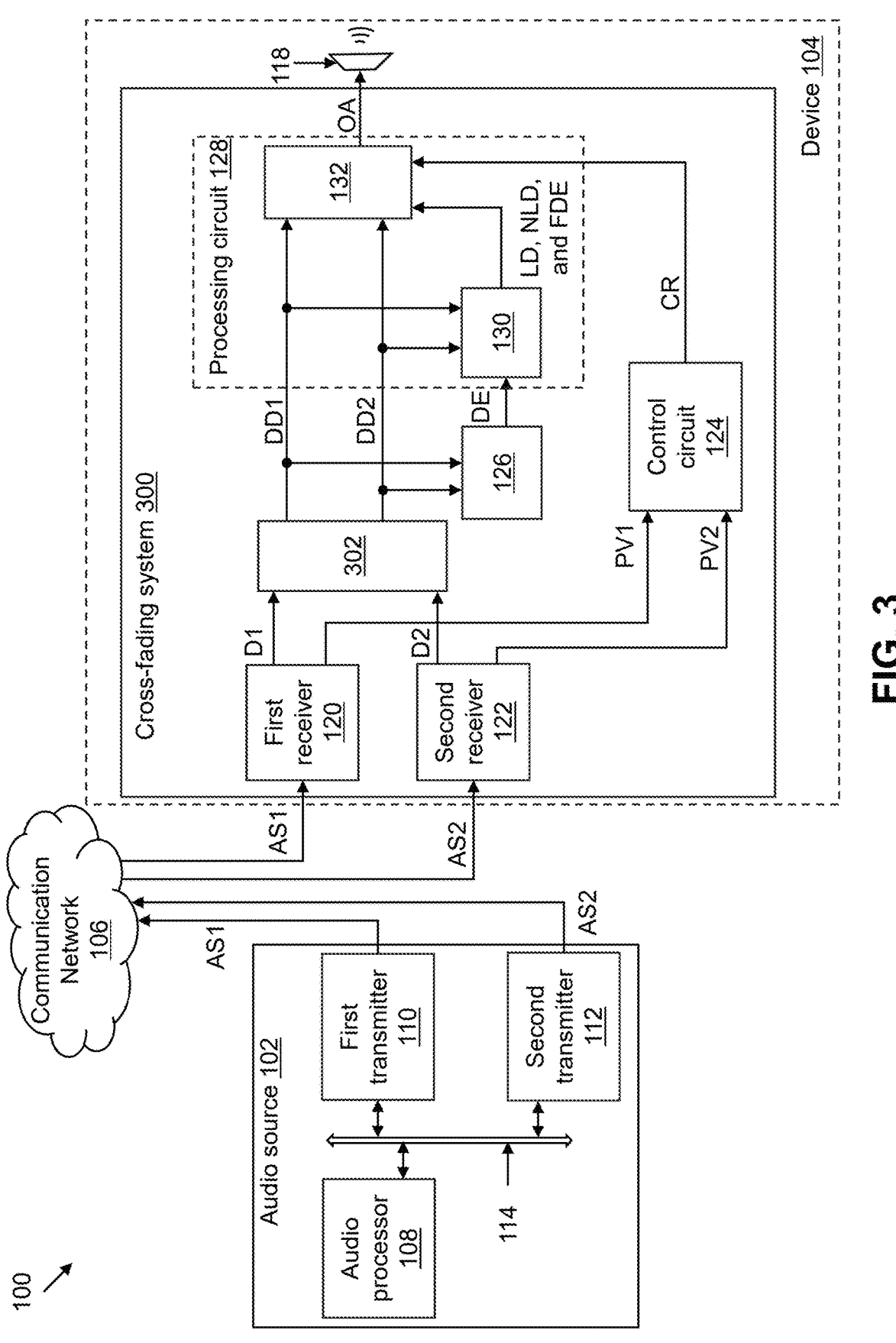
FIG. 3 illustrates a schematic diagram of the audio broadcast environment of FIG. 1, in accordance with another embodiment of the present disclosure.

FIG. 3 illustrates a schematic diagram of the audio broadcast environment 100, in accordance with another embodiment of the present disclosure.

The audio broadcast environment 100 may include the audio source 102 and the device 104. The audio broadcast environment 100 may further include the communication network 106. The device 104 may receive the audio signals (e.g., the first audio signal AS1 and the second audio signal AS2) from the audio source 102 by way of the communication network 106. The device 104 may include a cross-fading system 300 and the speaker 118. The cross-fading system 300 may include the first receiver 120, the second receiver 122, the control circuit 124, the synchronizer 126, the processing circuit 128, and a buffer 302. In present embodiment, the first temporal data and the second temporal data may correspond to first delay data DD1 and second delay data DD2, respectively, when the first temporal data and the second temporal data are delayed versions of the first data D1 and the second data D2, respectively.

Buffer 302:

The buffer 302 may be coupled to the first receiver 120, the second receiver 122, and the processing circuit 128. The buffer 302 may include suitable circuitry that may be configured to perform one or more operations. For example, the buffer 302 may be configured to receive the first data D1 and the second data D2 from the first receiver 120 and the second receiver 122, respectively. The buffer 302 may be further configured to adjust (e.g., delay) each of the first data D1 and the second data D2 and generate the first delay data DD1 and the second delay data DD2. The first delay data DD1 may be the delayed version of the first data D1 and the second delay data DD2 may be the delayed version of the second data D2. The buffer 302 may temporarily store each of the first data D1 and the second data D2 to ensure smooth playback of the output audio OA when the signal quality associated with one of the first audio signal AS1 or the second audio signal AS2 degrades. The buffer 302 may be further configured to provide the first delay data DD1 and the second delay data DD2 to the processing circuit 128 (e.g., the filter circuit 130 and the cross-fade circuit 132). The buffer 302 may be further configured to provide the first delay data DD1 and the second delay data DD2 to the synchronizer 126.

The synchronizer 126 may be coupled to the buffer 302. The synchronizer 126 may be configured to receive the first delay data DD1 and the second delay data DD2 from the buffer 302. The synchronizer 126 may be further configured to determine a delay estimate DE (e.g., a time delay) between the first delay data DD1 and the second delay data DD2. The synchronizer 126 may be further configured to provide the delay estimate DE to the filter circuit 130.

The filter circuit 130 may be coupled to the buffer 302 and the synchronizer 126. The filter circuit 130 may be further configured to receive the delay estimate DE from the synchronizer 126. The filter circuit 130 may be further configured to synchronize the first delay data DD1 and the second delay data DD2 based on the delay estimate DE. In an embodiment, the current playback data corresponds to the first delay data DD1.

The filter circuit 130 may be further configured to determine the linear data LD and the non-linear data NLD of the second delay data DD2 by adjusting the filter coefficients of the adaptive filter based on the NLMS algorithm. The filter circuit 130 may be further configured to determine the fine delay estimate FDE between the first delay data DD1 and the second delay data DD2. The fine delay estimate FDE may be indicative of the precise time delay between the first delay data DD1 and the second delay data DD2.

The cross-fade circuit 132 may be coupled to the control circuit 124, the synchronizer 126, the filter circuit 130, and the buffer 302. The cross-fade circuit 132 may be configured to receive the first delay data DD1 and the second delay data DD2 from the buffer 302. The cross-fade circuit 132 may be configured to receive the fine delay estimate FDE from the filter circuit 130. Further, the cross-fade circuit 132 may be configured to synchronize the first delay data DD1 and the second delay data DD2 based on the fine delay estimate FDE. The cross-fade circuit 132 may be further configured to receive the cross-fade request CR that may be generated based on analysis of the first parameter value PV1 in the first audio signal AS1. Based on the cross-fade request CR, the transition between the primary data stream (e.g., the first delay data DD1) and the secondary data stream (e.g., the second synchronized data DD2) may be initiated.

The cross-fade circuit 132 may be further configured to cross-fade, based on the received cross-fade request CR, the current playback data from the first delay data DD1 to the linear data LD of the second delay data DD2 for the first time period. The first time period may be configured to achieve seamless cross-fade between the first delay data DD1 and the linear data LD of the second delay data DD2.

The cross-fade circuit 132 may be further configured to determine iteratively whether the first time period has ended. The cross-fade circuit 132 may be further configured to insert the non-linear data NLD of the second delay data DD2 to the current playback data at the end of the first time period. The cross-fade circuit 132 may further generate the output audio OA based on the current playback data (e.g., the second delay data DD2).

Although it is mentioned that the cross-fade circuit 132 may insert the non-linear data NLD of the second delay data DD2 to the current playback data at the end of the first time period, in various other embodiments, the cross-fade circuit 132 may insert the non-linear data NLD of the second delay data DD2 to the current playback data when the first time period exceeds the threshold time period. For example, the first time period is set to twenty seconds and the threshold time period is eighteen seconds. Thus, the cross-fade circuit 132 may insert the non-linear data NLD of the second delay data DD2 to the current playback data at the eighteenth second. After inserting the non-linear data NLD of the second delay data DD2, the current playback data may correspond to the second delay data DD2. Further, the speaker 118 may play the output audio OA that may be generated based on the second delay data DD2.

FIGS. 4A-4D, collectively, represent a flowchart 400 that illustrates a cross-fading method for the audio signals (e.g., the first audio signal AS1 and the second audio signal AS2) received by the device 104, in accordance with an embodiment of the present disclosure.

Referring now to FIG. 4A, at step 402, the first receiver 120 and the second receiver 122 may receive the first audio signal AS1 and the second audio signal AS2, respectively. Each of the first audio signal AS1 and the second audio signal AS2 may correspond to one of the digital audio signal and the analog audio signal. At step 404, the first receiver 120 may convert the first audio signal AS1 to generate the first data D1. Further, the second receiver 122 may convert the second audio signal AS2 to generate the second data D2. After step 404, steps 406-418 and steps 420-426 are executed. At step 406, the buffer 302 may receive the first data D1 and the second data D2 from the first receiver 120 and the second receiver 122, respectively. At step 408, the buffer 302 may adjust the first data D1 and the second data D2 to generate the first delay data DD1 and the second delay data DD2, respectively. The first delay data DD1 and the second delay data DD2 may correspond to the first temporal data and the second temporal data, respectively. At step 410, the buffer 302 may provide the first temporal data (e.g., the first delay data DD1) and the second temporal data (e.g., the second delay data DD2) to the filter circuit 130 and the synchronizer 126.

Figure 4B:
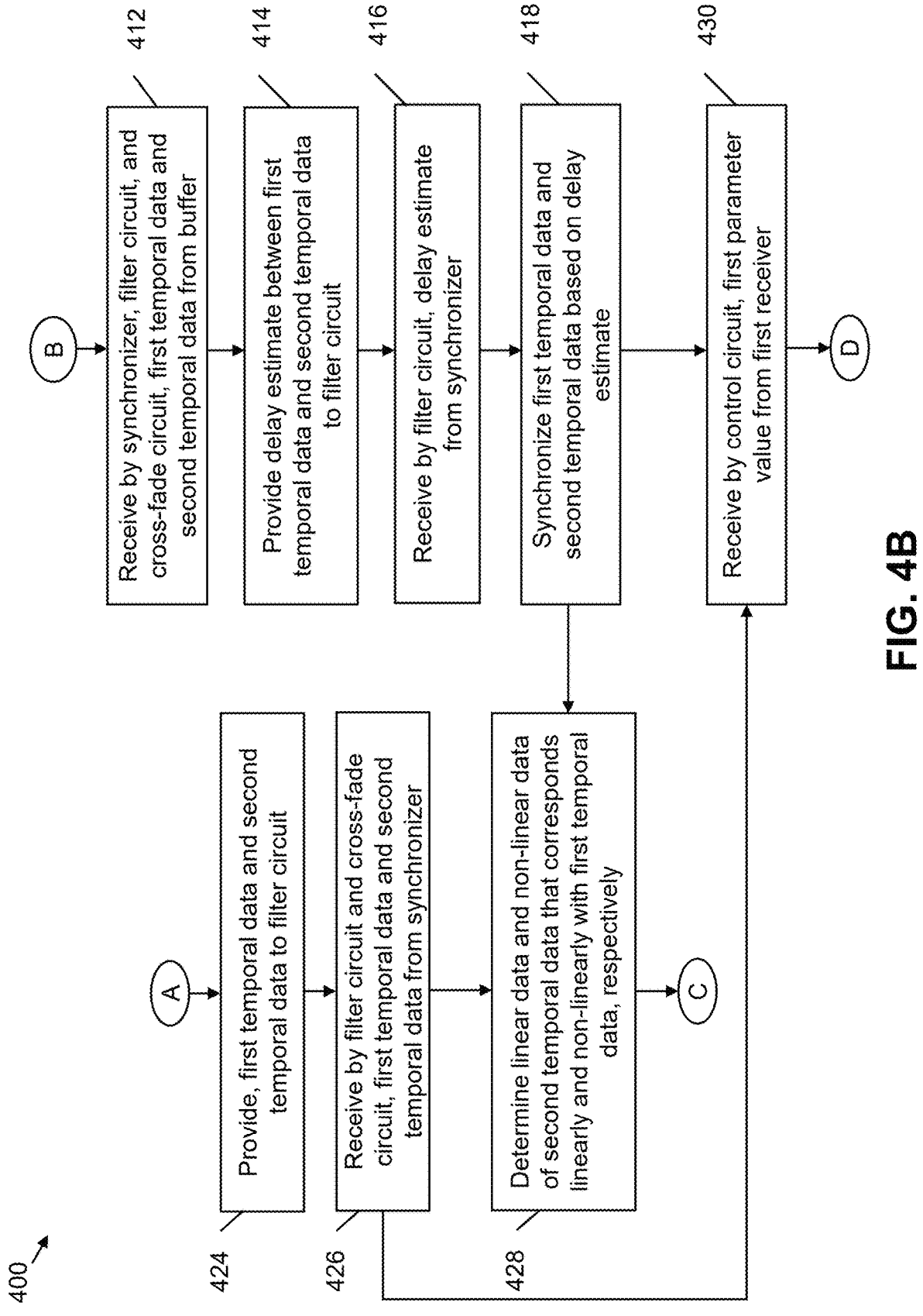

Referring now to FIG. 4B, at step 412, the synchronizer 126, the filter circuit 130, and the cross-fade circuit 132 may receive the first temporal data and the second temporal data from the buffer 302. The synchronizer 126 may determine the delay estimate DE between the first delay data DD1 and the second delay data DD2. At step 414, the synchronizer 126 may provide the delay estimate DE between the first temporal data and the second temporal data to the filter circuit 130. At step 416, the filter circuit 130 may further receive the delay estimate DE from the synchronizer 126. At step 418, the filter circuit 130 may synchronize the first temporal data and the second temporal data based on the delay estimate DE.

Referring back to FIG. 4A, at step 420, the synchronizer 126 may receive the first data D1 and the second data D2 from the first receiver 120 and the second receiver 122, respectively. At step 422, the synchronizer 126 may synchronize the first data D1 and the second data D2 based on the plurality of aspects to generate the first synchronized data SD1 and the second synchronized data SD2, respectively. Examples of the plurality of aspects may correspond to at least one of phase alignment, clock synchronization, clock drift alignment, time alignment, latency, buffering, sample rates, or the like. The first synchronized data SD1 and the second synchronized data SD2 may correspond to the first temporal data and the second temporal data.

Referring now to FIG. 4B, at step 424, the synchronizer 126 may provide the first temporal data (e.g., the first synchronized data SD1) and the second temporal data (e.g., the second synchronized data SD2) to the filter circuit 130. At step 426, the filter circuit 130 and the cross-fade circuit 132 may receive the first temporal data and the second temporal data from the synchronizer 126. After steps 418 and 426, step 428 and step 430 are executed. The first temporal data and the second temporal data may correspond to one of (i) the first synchronized data SD1 and the second synchronized data SD2, respectively, and (ii) the first delay data DD1 and the second delay data DD2, respectively.

At step 428, the filter circuit 130 may determine the linear data LD and the non-linear data NLD of the second temporal data (e.g., the second synchronized data SD2 or the second delay data DD2) that corresponds linearly and non-linearly with the first temporal data (e.g., the first synchronized data SD1 or the first delay data DD1), respectively. After step 428, step 432 is executed. At step 430, the control circuit 124 may receive the first parameter value PV1 of the signal quality associated with the first audio signal AS1 from the first receiver 120. After step 430, step 434 is executed.

Figure 4C:
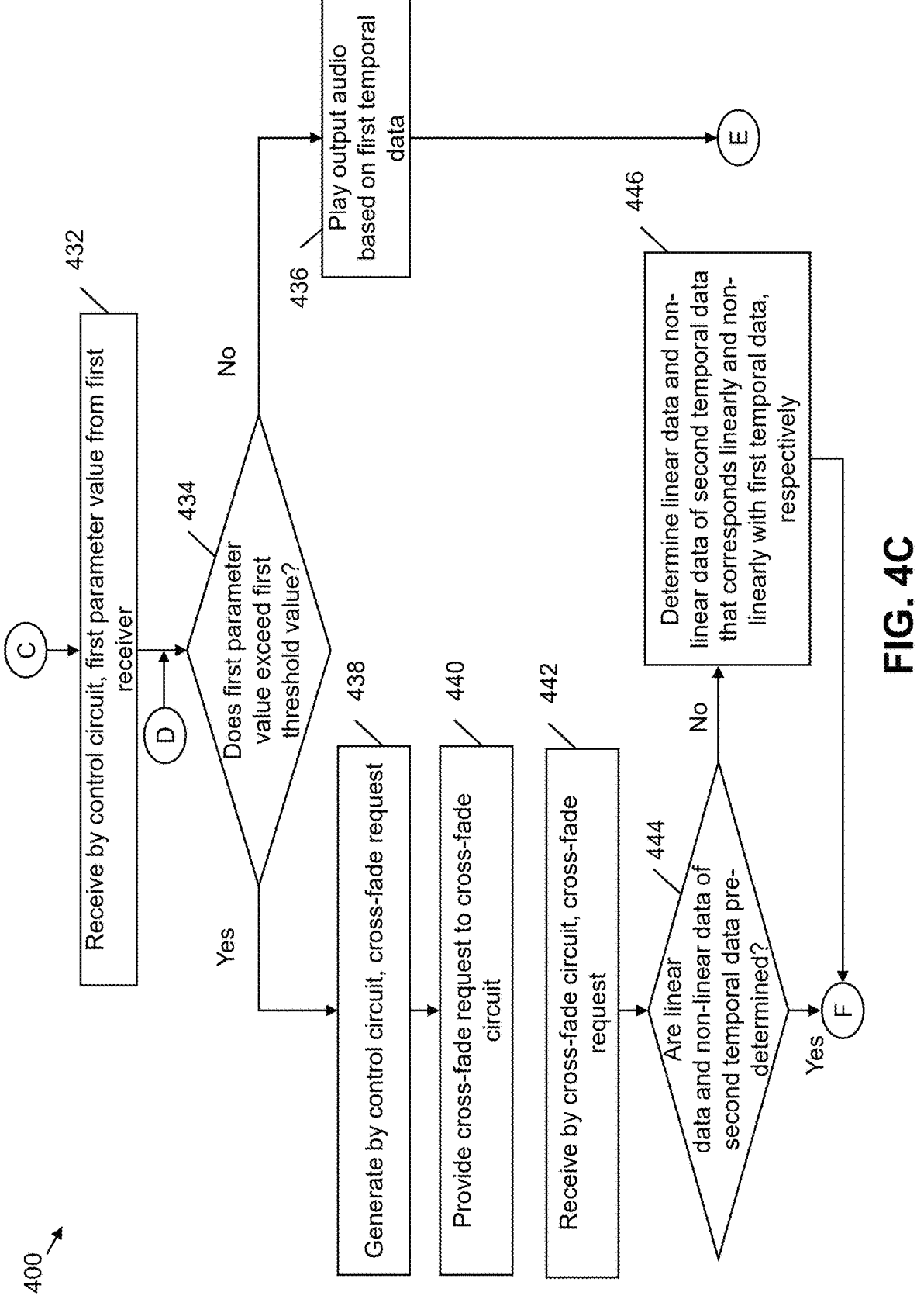

Referring now to FIG. 4C, at step 432, the control circuit 124 may receive the first parameter value PV1 of the signal quality associated with the first audio signal AS1 from the first receiver 120. At step 434, the control circuit 124 may determine whether the first parameter value PV1 exceeds the first threshold value. If at step 434, it is determined that the first parameter value PV1 is lower than the first threshold value, step 436 is performed. At step 436, the speaker 118 may play the output audio OA that may be generated based on the first temporal data. If at step 434, it is determined that the first parameter value PV1 exceeds the first threshold value, step 438 is performed. At step 438, the control circuit 124 may generate the cross-fade request CR to transition the current playback data from the first temporal data to the second temporal data. At step 440, the control circuit 124 may provide the cross-fade request CR to the cross-fade circuit 132. At step 442, the cross-fade circuit 132 may receive the cross-fade request CR from the control circuit 124 indicative of initiating the cross-fading. At step 444, the filter circuit 130 may identify whether the linear data LD and the non-linear data NLD of the second temporal data are pre-determined. If at step 444, it is identified that the linear data LD and the non-linear data NLD of the second temporal data remains to be determined, step 446 is performed. At step 446, the filter circuit 130 may determine the linear data LD and the non-linear data NLD of the second temporal data that corresponds linearly and non-linearly with the first temporal data, respectively. If at step 444, it is identified that the linear data LD and the non-linear data NLD of the second temporal data are pre-determined, step 448 is performed.

Referring now to FIG. 4D, at step 448, the filter circuit 130 may determine the fine delay estimate FDE between the first temporal data and the second temporal data. The fine delay estimate FDE may be indicative of the precise time delay between the first temporal data and the second temporal data. At step 450, the cross-fade circuit 132 may synchronize the first temporal data and the second temporal data based on the fine delay estimate FDE. At step 452, the cross-fade circuit 132 may cross-fade the current playback data from the first temporal data to the linear data LD of the second temporal data.

At step 454, the cross-fade circuit 132 may determine whether the cross-fade is complete. In other words, the cross-fade circuit 132 may check iteratively whether the first time period ended to confirm the completion of the cross-fade. If at step 454, it is determined that the cross-fade is incomplete, step 452 is performed. If at step 454, it is determined that the cross-fade is complete, step 456 is performed. At step 456, the cross-fade circuit 132 may insert the non-linear data NLD of the second temporal data to the current playback data such that the current playback data may correspond to the second temporal data. At step 458, the speaker 118 may play the output audio OA that may be generated based on the second temporal data. At step 460, the cross-fade circuit 132 may reset the cross-fade request CR when the current playback data may correspond to the second temporal data.

The processing circuit 128 of the present disclosure dynamically transitions from the first temporal data to the second temporal data when the reception of the first audio signal AS1 degrades. The processing circuit 128 may implement the adaptive filter based on the NLMS to determine the linear data LD of the second temporal data that may correspond linearly with the first temporal data. Utilizing the NLMS algorithm ensures low computational complexity, proof of convergence in a stable environment, and stable behavior with finite precision arithmetic as compared to other adaptive filtering algorithms. The cross-fade between the first temporal data and the linear data LD of the second temporal data followed by the insertion of the non-linear data NLD of the second temporal data eliminates audio discrepancies (e.g., comb-filtering artifact), thereby ensuring a seamless transition. In the absence of audio discrepancies, the duration for cross-fade may be extended that may result in an improved and uniform transition. The cross-fade may be based on time-domain processing (e.g., sample-wise processing), thereby reducing computational complexity and eliminating latency in the playback of audio. Further, a memory footprint required for the cross-fade is reduced as compared to conventional solutions that employ frequency domain processing. Additionally, synchronization of the first temporal data and the second temporal data based on the fine delay estimate FDE ensures precise alignment, thereby minimizing disruptions and enhancing the overall listening experience of the user.

In an embodiment, a system for cross-fading audio signals may comprise a processing circuit. The processing circuit may be configured to receive first temporal data associated with a first audio signal and second temporal data associated with a second audio signal, wherein current playback data may correspond to the first temporal data. The processing circuit may be further configured to determine linear data and non-linear data of the second temporal data, wherein the linear data and the non-linear data may be linearly and non-linearly correlated with the first temporal data, respectively. Additionally, the processing circuit may be further configured to cross-fade based on analysis of a signal quality associated with the first audio signal, the current playback data from the first temporal data to the linear data of the second temporal data. The processing circuit may be further configured to insert upon cross-fading the current playback data to the linear data, the non-linear data of the second temporal data to the current playback data such that the current playback data may correspond to the second temporal data.

In some embodiments, the system may further comprise a first receiver and a second receiver. The first receiver may be configured to receive the first audio signal. The first receiver may be further configured to convert the first audio signal to first data. Additionally, the first receiver may be further configured to determine a first parameter value of the signal quality associated with the first audio signal. The second receiver may be configured to receive the second audio signal. The second receiver may be further configured to convert the second audio signal to second data. Additionally, the second receiver may be further configured to determine a second parameter value of a signal quality associated with the second audio signal.

In some embodiments, the system may further comprise a control circuit coupled to the processing circuit, wherein the control circuit may be configured to receive the first parameter value from the first receiver. The control circuit may be further configured to generate a cross-fade request based on the first parameter value exceeding a first threshold value. The control circuit may be further configured to provide the cross-fade request to the processing circuit, wherein the processing circuit cross-fades based on the cross-fade request.

In some embodiments, the signal quality associated with each of the first audio signal and the second audio signal may correspond to at least one of a group consisting of a bit-error rate (BER), a cyclic redundancy check (CRC) error, a clock synchronization error, a quantization error, a loss of data, an interference, a clipping, a checksum error, a logic-error, an overflow error, an underflow error, a signal power indicator, a reception power level, reception information, and baseband information.

In some embodiments, the system may further comprise a synchronizer coupled to the first receiver, the second receiver, and the processing circuit, wherein the synchronizer may be configured to receive the first data and the second data from the first receiver and the second receiver, respectively. The synchronizer may be further configured to synchronize the first data and the second data based on a plurality of aspects to generate the first synchronized data and the second synchronized data, respectively. Additionally, the synchronizer may be further configured to provide the first synchronized data and the second synchronized data to the processing circuit, wherein the first synchronized data and the second synchronized data correspond to the first temporal data and the second temporal data, respectively.

In some embodiments, the plurality of aspects may correspond to one of a group consisting of phase alignment, clock synchronization, clock drift alignment, time alignment, latency, buffering, and sample rates.

In some embodiments, the system may further comprise a buffer coupled to the first receiver, the second receiver, and the processing circuit, wherein the buffer may be configured to receive the first data and the second data from the first receiver and the second receiver, respectively. The buffer may be further configured to adjust the first data and the second data to generate first delay data and the second delay data, wherein the first delay data and the second delay data may be delayed versions of the first data and the second data, respectively. The buffer may be further configured to provide the first delay data and the second delay data to the processing circuit, wherein the first delay data and the second delay data may correspond to the first temporal data and the second temporal data, respectively. The system may further comprise a synchronizer coupled to the buffer and the processing circuit, wherein the synchronizer may be configured to receive the first delay data and the second delay data from the buffer. The synchronizer may be configured to provide a delay estimate between the first delay data and the second delay data to the processing circuit, wherein the processing circuit may determine the linear data and the non-linear data of the second temporal data based on the delay estimate.

In some embodiments, each of the first audio signal and the second audio signal may correspond to one of (i) a digital audio signal and (ii) an analog audio signal.

In some embodiments, the processing circuit may determine the non-linear data of the second temporal data based on a difference between the second temporal data and the linear data of the second temporal data.

In some embodiments, the processing circuit may be further configured to adjust filter coefficients of an adaptive filter based on a normalized least mean square (NLMS) algorithm to determine the linear data of the second temporal data, wherein the filter coefficients may be adjusted dynamically based on the first temporal data. The processing circuit may be further configured to receive a cross-fade request, wherein the filter coefficients may be adjusted until the cross-fade request is received by the processing circuit, wherein the cross-fade request is generated based on the analysis of the signal quality associated with the first audio signal, and wherein the cross-fade request is indicative of initiating cross-fading.

In some embodiments, the processing circuit may be further configured to determine a fine delay estimate between the first temporal data and the second temporal data based on a time offset for a maximum value of the filter coefficients.

In some embodiments, the cross-fading of the current playback data from the first temporal data to the linear data of the second temporal data may be based on the fine delay estimate.

In some embodiments, the processing circuit may cross-fade the current playback data from the first temporal data to the linear data of the second temporal data for a first time period, wherein the processing circuit may insert the non-linear data of the second temporal data to the current playback data when the first time period may exceed a threshold time period.

In another embodiment, a cross-fading method may comprise receiving first temporal data associated with a first audio signal and second temporal data associated with a second audio signal, by a processing circuit, wherein current playback data may correspond to the first temporal data. The cross-fading method may further comprise determining linear data and non-linear data of the second temporal data by the processing circuit, wherein the linear data and the non-linear data may be linearly and non-linearly correlated with the first temporal data, respectively. The cross-fading method may further comprise cross-fading, the current playback data from the first temporal data to the linear data of the second temporal data by the processing circuit based on analysis of a signal quality associated with the first audio signal. Additionally, the cross-fading method may further comprise inserting the non-linear data of the second temporal data to the current playback data upon cross-fading to the linear data by the processing circuit such that the current playback data may correspond to the second temporal data.

In some embodiments, the method may further comprise receiving the first audio signal by a first receiver. The method may further comprise converting the first audio signal by the first receiver to first data. Further, the method may comprise determining a first parameter value of the signal quality associated with the first audio signal by the first receiver. Additionally, the method may further comprise receiving the second audio signal by a second receiver. The method may further comprise converting the second audio signal by the second receiver to second data. Further, the method may comprise determining a second parameter value of a signal quality associated with the second audio signal by the second receiver.

In some embodiments, the method may further comprise receiving the first parameter value from the first receiver by a control circuit. The method may further comprise generating a cross-fade request by the control circuit based on the first parameter value exceeding a first threshold value. The method may further comprise transmitting the cross-fade request to the processing circuit by the control circuit, wherein the processing circuit cross-fades based on the cross-fade request.

In some embodiments, the method may further comprise receiving the first data and the second data from the first receiver and the second receiver, respectively by a synchronizer. The method may further comprise synchronizing the first data and the second data by the synchronizer based on a plurality of aspects to generate the first synchronized data and the second synchronized data, wherein the plurality of aspects of the synchronization may correspond to one of a group consisting of phase alignment, clock synchronization, clock drift alignment, time alignment, latency, buffering, and sample rates. The method may further comprise providing the first synchronized data and the second synchronized data by the synchronizer to the processing circuit, wherein the first synchronized data and the second synchronized data correspond to the first temporal data and the second temporal data, respectively.

In some embodiments, the method may further comprise adjusting filter coefficients of an adaptive filter by the processing circuit based on a normalized least mean square (NLMS) algorithm to determine the linear data of the second temporal data, wherein the filter coefficients may be adjusted dynamically based on the first temporal data. The method may further comprise receiving a cross-fade request by the processing circuit, wherein the filter coefficients may be adjusted until the cross-fade request is received by the processing circuit, wherein the cross-fade request is generated based on the analysis of the signal quality associated with the first audio signal, and wherein the cross-fade request is indicative of initiating cross-fading.

In some embodiments, the method may further comprise determining a fine delay estimate between the first temporal data and the second temporal data by the processing circuit based on a time offset for a maximum value of the filter coefficients, wherein the cross-fading of the current playback data from the first temporal data to the linear data of the second temporal data may be based on the fine delay estimate.

In yet another embodiment, a cross-fading method may comprise receiving first temporal data associated with a first audio signal and second temporal data associated with a second audio signal by a processing circuit, wherein current playback data may correspond to the first temporal data. The cross-fading method may further comprise determining linear data and non-linear data of the second temporal data by the processing circuit based on analysis of a signal quality associated with the first audio signal, wherein the linear data and the non-linear data may be linearly and non-linearly correlated with the first temporal data, respectively. The cross-fading method may further comprise cross-fading the current playback data from the first temporal data to the linear data of the second temporal data by the processing circuit upon determining the linear data and the non-linear data of the second temporal data. Additionally, the cross-fading method may further comprise inserting the non-linear data of the second temporal data to the current playback data upon cross-fading to the linear data by the processing circuit such that the current playback data may correspond to the second temporal data.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for cross-fading audio signals, the system comprising:
   a processing circuit configured to:
      receive first temporal data associated with a first audio signal and second temporal data associated with a second audio signal, wherein current playback data corresponds to the first temporal data;
      determine linear data and non-linear data of the second temporal data, wherein the linear data and the non-linear data are linearly and non-linearly correlated with the first temporal data, respectively;
      cross-fade, based on analysis of a signal quality associated with the first audio signal, the current playback data from the first temporal data to the linear data of the second temporal data; and
      insert, upon cross-fading the current playback data to the linear data, the non-linear data of the second temporal data to the current playback data such that the current playback data corresponds to the second temporal data.

2. The system of claim 1, further comprising:
   a first receiver configured to:
      receive the first audio signal;
      convert the first audio signal to first data; and
      determine a first parameter value of the signal quality associated with the first audio signal; and
   a second receiver configured to:
      receive the second audio signal;
      convert the second audio signal to second data; and
      determine a second parameter value of a signal quality associated with the second audio signal.

3. The system of claim 2, further comprising a control circuit coupled to the processing circuit, wherein the control circuit is configured to:

receive the first parameter value from the first receiver;

generate a cross-fade request based on the first parameter value exceeding a first threshold value; and provide the cross-fade request to the processing circuit, wherein the processing circuit cross-fades based on the cross-fade request.

4. The system of claim 2, wherein the signal quality associated with each of the first audio signal and the second audio signal corresponds to at least one of a group consisting of a bit-error rate (BER), a cyclic redundancy check (CRC) error, a clock synchronization error, a quantization error, a loss of data, an interference, a clipping, a checksum error, a logic-error, an overflow error, an underflow error, a signal power indicator, a reception power level, reception information, and baseband information.

5. The system of claim 2, further comprising a synchronizer coupled to the first receiver, the second receiver, and the processing circuit, wherein the synchronizer is configured to:

receive the first data and the second data from the first receiver and the second receiver, respectively;

synchronize the first data and the second data based on a plurality of aspects to generate first synchronized data and second synchronized data, respectively; and provide the first synchronized data and the second synchronized data to the processing circuit, wherein the first synchronized data and the second synchronized data correspond to the first temporal data and the second temporal data, respectively.

6. The system of claim 5, wherein the plurality of aspects correspond to one of a group consisting of phase alignment, clock synchronization, clock drift alignment, time alignment, latency, buffering, and sample rates.

7. The system of claim 2, further comprising:

a buffer coupled to the first receiver, the second receiver, and the processing circuit, wherein the buffer is configured to:

receive the first data and the second data from the first receiver and the second receiver, respectively;

adjust the first data and the second data to generate first delay data and second delay data, wherein the first delay data and the second delay data are delayed versions of the first data and the second data, respectively; and provide the first delay data and the second delay data to the processing circuit, wherein the first delay data and the second delay data correspond to the first temporal data and the second temporal data, respectively; and a synchronizer coupled to the buffer and the processing circuit, wherein the synchronizer is configured to:

receive the first delay data and the second delay data from the buffer; and provide a delay estimate between the first delay data and the second delay data to the processing circuit, wherein the processing circuit determines the linear data and the non-linear data of the second temporal data based on the delay estimate.

8. The system of claim 1, wherein each of the first audio signal and the second audio signal corresponds to one of (i) a digital audio signal and (ii) an analog audio signal.

9. The system of claim 1, wherein the processing circuit determines the non-linear data of the second temporal data based on a difference between the second temporal data and the linear data of the second temporal data.

10. The system of claim 1, wherein the processing circuit is further configured to:

adjust filter coefficients of an adaptive filter, based on a normalized least mean square (NLMS) algorithm to determine the linear data of the second temporal data, wherein the filter coefficients are adjusted dynamically based on the first temporal data; and receive a cross-fade request, wherein the filter coefficients are adjusted until the cross-fade request is received, wherein the cross-fade request is generated based on the analysis of the signal quality associated with the first audio signal, and wherein the cross-fade request is indicative of initiating cross-fading.

11. The system of claim 10, wherein the processing circuit is further configured to determine a fine delay estimate between the first temporal data and the second temporal data based on a time offset for a maximum value of the filter coefficients.

12. The system of claim 11, wherein the cross-fading of the current playback data from the first temporal data to the linear data of the second temporal data is based on the fine delay estimate.

13. The system of claim 1, wherein the processing circuit cross-fades the current playback data from the first temporal data to the linear data of the second temporal data for a first time period, and wherein the processing circuit inserts the non-linear data of the second temporal data to the current playback data when the first time period exceeds a threshold time period.

14. A cross-fading method comprising:

receiving, by a processing circuit, first temporal data associated with a first audio signal and second temporal data associated with a second audio signal, wherein current playback data corresponds to the first temporal data;

determining, by the processing circuit, linear data and non-linear data of the second temporal data, wherein the linear data and the non-linear data are linearly and non-linearly correlated with the first temporal data, respectively;

cross-fading based on analysis of a signal quality associated with the first audio signal, by the processing circuit, the current playback data from the first temporal data to the linear data of the second temporal data; and inserting, by the processing circuit, the non-linear data of the second temporal data to the current playback data upon the cross-fading to the linear data such that the current playback data corresponds to the second temporal data.

15. The cross-fading method of claim 14, further comprising:

receiving, by a first receiver, the first audio signal;

converting, by the first receiver, the first audio signal to first data;

determining, by the first receiver, a first parameter value of the signal quality associated with the first audio signal;

receiving, by a second receiver, the second audio signal;

converting, by the second receiver, the second audio signal to second data; and determining, by the second receiver, a second parameter value of a signal quality associated with the second audio signal.

16. The cross-fading method of claim 15, further comprising:

receiving, by a control circuit, the first parameter value from the first receiver;

generating, by the control circuit, a cross-fade request based on the first parameter value exceeding a first threshold value; and providing, by the control circuit, the cross-fade request to the processing circuit, wherein the processing circuit cross-fades based on the cross-fade request.

17. The cross-fading method of claim 15, further comprising:

receiving, by a synchronizer, the first data and the second data from the first receiver and the second receiver, respectively;

synchronizing, by the synchronizer, the first data and the second data based on a plurality of aspects to generate first synchronized data and second synchronized data, wherein the plurality of aspects of the synchronization corresponds to one of a group consisting of phase alignment, clock synchronization, clock drift alignment, time alignment, latency, buffering, and sample rates; and providing, by the synchronizer, the first synchronized data and the second synchronized data to the processing circuit, wherein the first synchronized data and the second synchronized data correspond to the first temporal data and the second temporal data, respectively.

18. The cross-fading method of claim 14, further comprising:

adjusting, by the processing circuit, filter coefficients of an adaptive filter based on a normalized least mean square (NLMS) algorithm to determine the linear data of the second temporal data, wherein the filter coefficients are adjusted dynamically based on the first temporal data; and receiving, by the processing circuit, a cross-fade request, wherein the filter coefficients are adjusted until the cross-fade request is received, wherein the cross-fade request is generated based on the analysis of the signal quality associated with the first audio signal, and wherein the cross-fade request is indicative of initiating cross-fading.

19. The cross-fading method of claim 18, further comprising determining, by the processing circuit, a fine delay estimate between the first temporal data and the second temporal data based on a time offset for a maximum value of the filter coefficients, wherein the cross-fading of the current playback data from the first temporal data to the linear data of the second temporal data is based on the fine delay estimate.

20. A cross-fading method comprising:

receiving, by a processing circuit, first temporal data associated with a first audio signal and second temporal data associated with a second audio signal, wherein current playback data corresponds to the first temporal data;

determining, by the processing circuit, based on analysis of a signal quality associated with the first audio signal, linear data and non-linear data of the second temporal data, wherein the linear data and the non-linear data are linearly and non-linearly correlated with the first temporal data, respectively;

cross-fading, by the processing circuit, the current playback data from the first temporal data to the linear data of the second temporal data based on the linear data and the non-linear data of the second temporal data; and inserting, by the processing circuit, the non-linear data of the second temporal data to the current playback data upon the cross-fading to the linear data such that the current playback data corresponds to the second temporal data.

* * * * *